US012619221B2

(12) United States Patent
Liu et al.

(10) Patent No.: US 12,619,221 B2
(45) Date of Patent: May 5, 2026

(54) SMART FACTORY SYSTEM

(71) Applicants: Chih-Neng Liu, Taichung City (TW);
Chih-Yung Liu, Taichung City (TW)

(72) Inventors: Chih-Neng Liu, Taichung City (TW);
Chih-Yung Liu, Taichung City (TW)

( * ) Notice: Subject to any disclaimer, the term of this patent is extended or adjusted under 35 U.S.C. 154(b) by 461 days.

(21) Appl. No.: 18/237,899

(22) Filed: Aug. 25, 2023

(65) Prior Publication Data

US 2025/0068150 A1 Feb. 27, 2025

(51) Int. Cl.
G05B 19/418 (2006.01)

(52) U.S. Cl.
CPC ............... G05B 19/4188 (2013.01); G05B 2219/31001 (2013.01)

(58) Field of Classification Search
None
See application file for complete search history.

(56) References Cited

U.S. PATENT DOCUMENTS

2025/0370437 A1* 12/2025 Mitura ............... G05B 19/4184

FOREIGN PATENT DOCUMENTS

| CA | 2857355 C | * | 6/2022 | ......... G05B 19/0421 |
|----|-----------|---|--------|------------------------|
| KR | 20230009655 A | * | 1/2023 | ............... G06N 3/02 |
| KR | 20230044619 A | * | 4/2023 | ............. G05B 23/02 |
| KR | 102523738 B1 | * | 5/2023 | ....... G06Q 10/06375 |
| KR | 20230065477 A | * | 5/2023 | ......... G06Q 10/0637 |

OTHER PUBLICATIONS

Wenjin Yu et al, An Integrated Framework for Health State Monitoring in a Smart Factory Employing IoT and Big Data Techniques, Feb. 1, 2022; all pages. (Year: 2022).*

* cited by examiner

*Primary Examiner* — Howard Cortes
(74) *Attorney, Agent, or Firm* — BruceStone LLP; Joseph A. Bruce

(57) ABSTRACT

A smart factory system for being set up between a smart factory and a backend-system provider is disclosed. The smart factory system includes: a factory installation, being installed in the smart factory; a plurality of sensors, being in connection with the factory installation; a smart machine box, being signally connected to each of the sensors; a computing and storing apparatus, being set up at premises of the backend-system provider; and a query-making apparatus. With the most cost-intensive functions like computing and storing set up and maintained by the backend-system provider, a smart factory can be easily started and run by locally setting up and maintaining sensors and smart machine boxes while remotely subscribing the functions maintained by the backend-system provider as services with payment. The system significantly reduces the costs for stating and running a smart factory, thereby encouraging transformation into or establishment of smart factories.

8 Claims, 2 Drawing Sheets

SMART FACTORY SYSTEM

BACKGROUND

Field of the Invention

The present invention relates to management systems for factories, and more particularly to a smart factory system.

Description of Related Art

A smart factory is built by having all factory installations therein connected to a network through the internet and features the ability to monitor and adjust these installations in a real-time manner. To be specific, by putting installations of a factory online and connecting them to production lines of the factory, the manufacturing process and workflows in the factory can be in full control. This ability allows a factory owner to collect accurate production data, to develop reasonable production plans, to monitor production progress, and to properly address any uncertainty between product designs and production results, thereby enhancing production performance and enabling automatic production, and eventually achieving manufacturing with improved flexibility in terms of factory process.

Currently, a smart factory collects production-related data using sensors and a receiver. The sensors are installed throughout the production line for measuring or capturing data about, for example, abnormality, quantity, temperature, energy, environmental safety metrics, etc. These data, depending of their natures, may be first sent to a computing element where they are integrated and process before sent to the receiver or directly sent to the receiver as signals. At last, the receiver outputs its computing results to a backend system where the computing results are displayed and/or further analyzed for enabling prediction. Since the conventional practices for starting smart factories are mainly of a custom nature, to start a new smart factory, a factory owner has to discuss with manufacturers of involved factory installations one by one and repeatedly refine the factory layout. The whole process is thus both time-and cost-consuming. Particularly, performance of a smart factory highly relies on the support of data-based analysis and prediction, which necessitates a backend system with strong computing power. However, expensive infrastructure of such a backend can prevent owners of small-and middle factories from investing in transformation into or establishment of smart factories.

SUMMARY

The objective of the present invention is to provide a smart factory system, which is easy to build, highly compatible to various devices, favorable to energy recovery and environmental safety, and markedly cost-saving.

To achieve the foregoing objective, the present invention provides a smart factory system for being set up between a smart factory and a backend-system provider. The smart factory system comprises: a factory installation, being installed in the smart factory, and having a monitoring feature and a routine feature; a plurality of sensors, being connected to the factory installation to sense the monitoring feature and the routine feature of the factory installation, thereby generating a monitoring signal and a routine signal, respectively; a smart machine box, being signally connected to each of the sensors, and having a first receiving unit, a first computing unit, a first displaying unit, a first storing unit, a receiving and converting unit, a processing unit, and a first communicating unit; the first receiving unit being used to receive the routine signal and transmit the routine signal to the first computing unit; the first computing unit being used to receive the routine signal and generate a routine data set by means of computing according to the routine signal; the first displaying unit being used to display the routine data set; the first storing unit being used to store the routine data set; the receiving and converting unit being used to receive the monitoring signal and convert the monitoring signal into a monitoring data set; the processing unit, being signally connected to the first computing unit and the receiving and converting unit, and being used to reformat, classify and output the routine data set and the monitoring data set; the first communicating unit, being signally connected to the processing unit, and being used to output the reformatted and classified routine data set and monitoring data set; a computing and storing apparatus, being set up at premises of the backend-system provider, and having a second communicating unit, a second computing unit, a second storing unit, a real-time monitoring display module, and a real-time routine display module; the second communicating unit in communicative connection with the first communicating unit, and being used to receive the routine data set and the monitoring data set output by the first communicating unit; the second computing unit signally connected to the second communicating unit, being used to receive and perform computing on the routine data set so as to generate a real-time routine data set; the second storing unit being used to store the real-time routine data set; the real-time routine display module being used to display the real-time routine data set in a real-time manner; the real-time monitoring display module being used to display the monitoring data set in a real-time manner; and a query-making apparatus, being signally connected to the computing and storing apparatus, and having a display interface that is used to display the real-time monitoring data set and the routine data set in a real-time manner.

With the configuration, the present invention has the following effects. With the most cost-intensive functions like computing and storing set up and maintained by the backend-system provider, a smart factory can be easily started and run by locally setting up and maintaining sensors and smart machine boxes while remotely subscribing the functions maintained by the backend-system provider as services with payment. The system significantly reduces the costs for stating and running a smart factory, thereby encouraging transformation into or establishment of smart factories. In addition, since the computing and storing apparatus is set up and maintained by the backend-system provider, it is feasible that multiple small-to middle-scale factories remotely share part of infrastructure and/services for computing and storing functions, thereby further reducing the costs for starting and running smart factories.

Preferably, the processing unit is a gateway.

Preferably, the display interface has an alarm module, which generates an alarm signal when being activated, in which the alarm signal is displayed at the first displaying unit of the smart machine box through the computing and storing apparatus.

Preferably, the display interface sends the alarm signal to a factory installation provider providing the factory installation.

Preferably, the real-time routine data set generated by the second computing unit through computing includes data of production capacity analysis, progress estimation, efficiency analysis, cost analysis, energy and carbon-emission analysis, or inspection overtime notifications.

Preferably, the real-time routine display module displays height difference values, consumables lifetime values, environmental safety values, energy safety values, line support notifications, line idle notifications, and/or qualitative abnormality notifications.

Preferably, the real-time monitoring display module displays production overview, production capacity, and/or factory installation status.

Preferably, the smart factory system further comprises a plurality of extension factory installations, a plurality of extension sensors, and a plurality of extension smart machine boxes, in which each of the extension factory installations is similar to the factory installation for similarly having a monitoring feature and a routine feature, and each of the extension sensors is similar to the sensors for similarly being used to sense the monitoring feature and the routine feature of each of the extension factory installations, so as to generate monitoring signals and routine signals, respectively, in which each of the extension smart machine boxes has a first receiving unit, a first computing unit, a first displaying unit, a first storing unit, and a receiving and converting unit similar to those of the smart machine box, wherein the first computing unit and the receiving and converting unit of each of the extension smart machine boxes are signally connected to the processing unit of the smart machine box.

DETAILED DESCRIPTION

Figure 1:
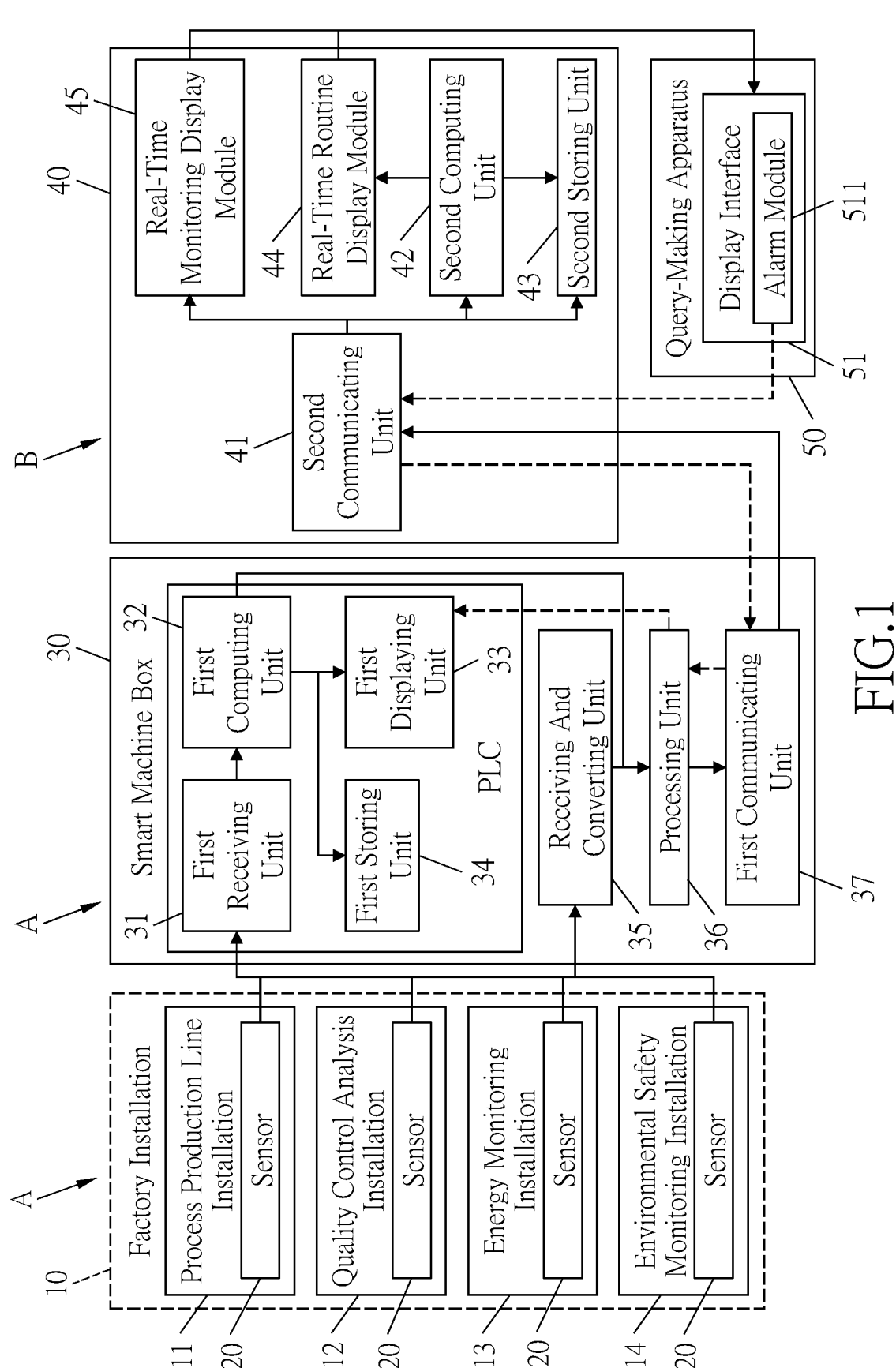
FIG. 1 is a block diagram illustrating a first embodiment of the present invention.

Referring to FIG. 1, the first embodiment of the present invention provides a smart factory system for being set up between a smart factory A and a backend-system provider B. While a single smart factory A is described herein, the present invention is not limited thereto. Alternatively, the present invention may be set up between multiple smart factories A and one backend-system provider B. The smart factory system primarily comprises a factory installation 10, a plurality of sensors 20, a smart machine box 30, a computing and storing apparatus 40, and a query-making apparatus 50, which will be detailed below.

The factory installation 10 is set up in the smart factory A, and has a monitoring feature and a routine feature. In the present embodiment, the factory installation 10 may include a process production line installation 11, a quality control analysis installation 12, an energy monitoring installation 13, or an environmental safety monitoring installation 14. Therein, the routine feature is a feature to be subject to calculation and comparison, such as: height difference values, consumables lifetime values, environmental safety values, energy safety values, line support notifications, line idle notifications, qualitative abnormality notifications, etc. The monitoring feature is a feature not to be subject to calculation and comparison, such as: production overview, production capacity, and installation status.

Each of the sensors 20 is connected to the process production line installation 11, the quality control analysis installation 12, the energy monitoring installation 13, and the environmental safety monitoring installation 14, and is used to sense monitoring features and routine features of the process production line installation 11, the quality control analysis installation 12, the energy monitoring installation 13, and the environmental safety monitoring installation 14, in order to generate a monitoring signal and a routine signal. Therein, each of the sensors 20 has a sensing property (e.g., quantity, temperature, current, voltage, etc.) that is determined by the monitoring feature and the routine feature it is configured to sense.

The smart machine box 30 is signally connected to each of the sensors 20 and has a first receiving unit 31, a first computing unit 32, a first displaying unit 33, a first storing unit 34, a receiving and converting unit 35, a processing unit 36, and a first communicating unit 37. Therein, the first receiving unit 31, the first computing unit 32, the first displaying unit 33, and the first storing unit 34 form a part of a programmable logic controller (PLC). The first receiving unit 31 is signally connected to each of the sensors 20 so as to receive the routine signal output by each of the sensors 20, and transmit the routine signals to the first computing unit 32. The first computing unit 32 is signally connected to the first receiving unit 31 so as to receive the routine signal and generate a routine data set by means of computing according to the routine signal. The first displaying unit 33 is signally connected to the first receiving unit 31 so as to receive and display the routine data set. The first storing unit 34 is signally connected to the first receiving unit 31 so as to receive and store the routine data set. The receiving and converting unit 35 is signally connected to each of the sensors 20 so as to receive the monitoring signal output by each of the sensors 20 and convert the monitoring signal into a monitoring data set. The processing unit 36 is signally connected to the first computing unit 32 and the receiving and converting unit 35 so as to reformat, classify and output the routine data set and the monitoring data set. The first communicating unit 37 is signally connected to the processing unit 36 so as to wirelessly output the routine data set and monitoring data set that have been reformatted and classified. In the present embodiment, the processing unit is a gateway.

The computing and storing apparatus 40 is set up at premises of the backend-system provider B and has a second communicating unit 41, a second computing unit 42, a second storing unit 43, a real-time routine display module 44, and a real-time monitoring display module 45. The second communicating unit 41 is wirelessly connected to the first communicating unit 37 so as to receive the routine data set and the monitoring data set output by the first communicating unit 37. The second computing unit 42 is signally connected to the second communicating unit 41 so as to receive and perform computing on the routine data set, thereby generating a real-time routine data set. The second storing unit 43 is signally connected to the second computing unit 42 and the second communicating unit 41 so as to receive and store the real-time routine data set of the second computing unit 42. The second storing unit 43 further receives and stores the monitoring data set. The real-time routine display module 44 is signally connected to the second computing unit 42 so as to receive and display the real-time routine data set in a real-time manner. The real-time monitoring display module 45 is signally connected to the second communicating unit 41 so as to receive and display the monitoring data set in a real-time manner. In the present embodiment, the real-time routine data set generated by the second computing unit 42 through computing may include data of production capacity analysis, progress estimation, efficiency analysis, cost analysis, energy and carbon-emission analysis, or inspection overtime notifications.

The real-time routine display module 44 displays height difference values, consumables lifetime values, environmental safety values, energy safety values, line support notifications, line idle notifications, and/or qualitative abnormality notifications. The real-time monitoring display module 45 display production overview, production capacity, and/or factory installation status. In the present embodiment, the backend-system provider B may engage resources from a telecommunications company, and the processing unit 36 of the smart machine box 30 performs transmission of the monitoring data set and the routine data set for the gateway, so that the gateway performs computing on the monitoring data set and the routine data set of the protocol-secured network adopted by the smart machine box 30 to convert the data into signals recognizable to the protocol-secured network adopted by the computing and storing apparatus 40, thereby accomplishing data transmission between the smart machine box 30 and the computing and storing apparatus 40 while ensuring security of the data transmitted.

The query-making apparatus 50 is signally connected to the computing and storing apparatus 40, and has a display interface 51 that is used to display the real-time monitoring data set and the routine data set in a real-time manner. In the present embodiment, the query-making apparatus 50 is a device capable of accessing networks, such as a desktop computer, a laptop computer, a tablet computer, a smartphone, etc. A user properly entering an account name and a related password can access the display interface 51 to read the real-time monitoring data set and the routine data set displayed therein on the present moment. Moreover, the display interface 51 has an alarm module 511, which when being activated can generate an alarm signal. The alarm signal is then displayed at the first displaying unit 33 of the smart machine box 30 through the computing and storing apparatus 40. The alarm signal is fed back to the system through a feedback route as indicated by the dotted line in FIG. 1 so as to direct field personnel to respond. Meanwhile, the display interface 51 may transmit the alarm signal to the manufacturer of the factory installation to inform the manufacturer of issues appearing at the factory installation 10 in the smart factory A and enable the manufacturer to take relevant measures.

With the components and configuration of the first embodiment described previously, the present invention operates and works as explained below.

By having the computing and storing apparatus 40 set up and maintained by backend-system provider B and the smart machine box 30 and having the sensors 20 set up and maintained by the smart factory A, in the present invention, the second computing unit 42 of the computing and storing apparatus 40 receives and performs computing on the routine data set output by the smart machine box 30, so that in the event of any abnormality, the backend-system provider B can instantly inform the smart factory A, for the latter to respond timely or record for post-hoc analysis and future improvements in production capacity and yield. Of course, when neither of the parties (the factory A and the backend-system provider B) is present around the factory installation 10, either or both of them may monitor the real-time routine data set and the monitoring data set remotely through the display interface 51 by operating the query-making apparatus 50 and timely activate the alarm module 511 when necessary to let the generated alarm signal be sent to and displayed at the first displaying unit 33 of the smart machine box 30 or reported to the manufacturer of the factory installation, so that the field personnel of the factory A or the manufacturer of the factory installation is informed of the issues of the factory installation 10 in the factory A and take responsive measures.

To sum up, with the most cost-intensive apparatuses like a computing and storing apparatus 40 set up and maintained by the backend-system provider B, a smart factory A can be easily started and run by locally setting up and maintaining sensors 20 and smart machine boxes 30 while remotely subscribing the functions maintained by the backend-system provider B as services with payment. The system significantly reduces the costs for stating and running a smart factory A, thereby encouraging transformation into or establishment of smart factories. In addition, since the computing and storing apparatus 40 is set up and maintained by the backend-system provider B, it is feasible that multiple small-to middle-scale factories A remotely share part of infrastructure and/services for computing and storing functions, thereby further reducing the costs for starting and running smart factories.

Figure 2:
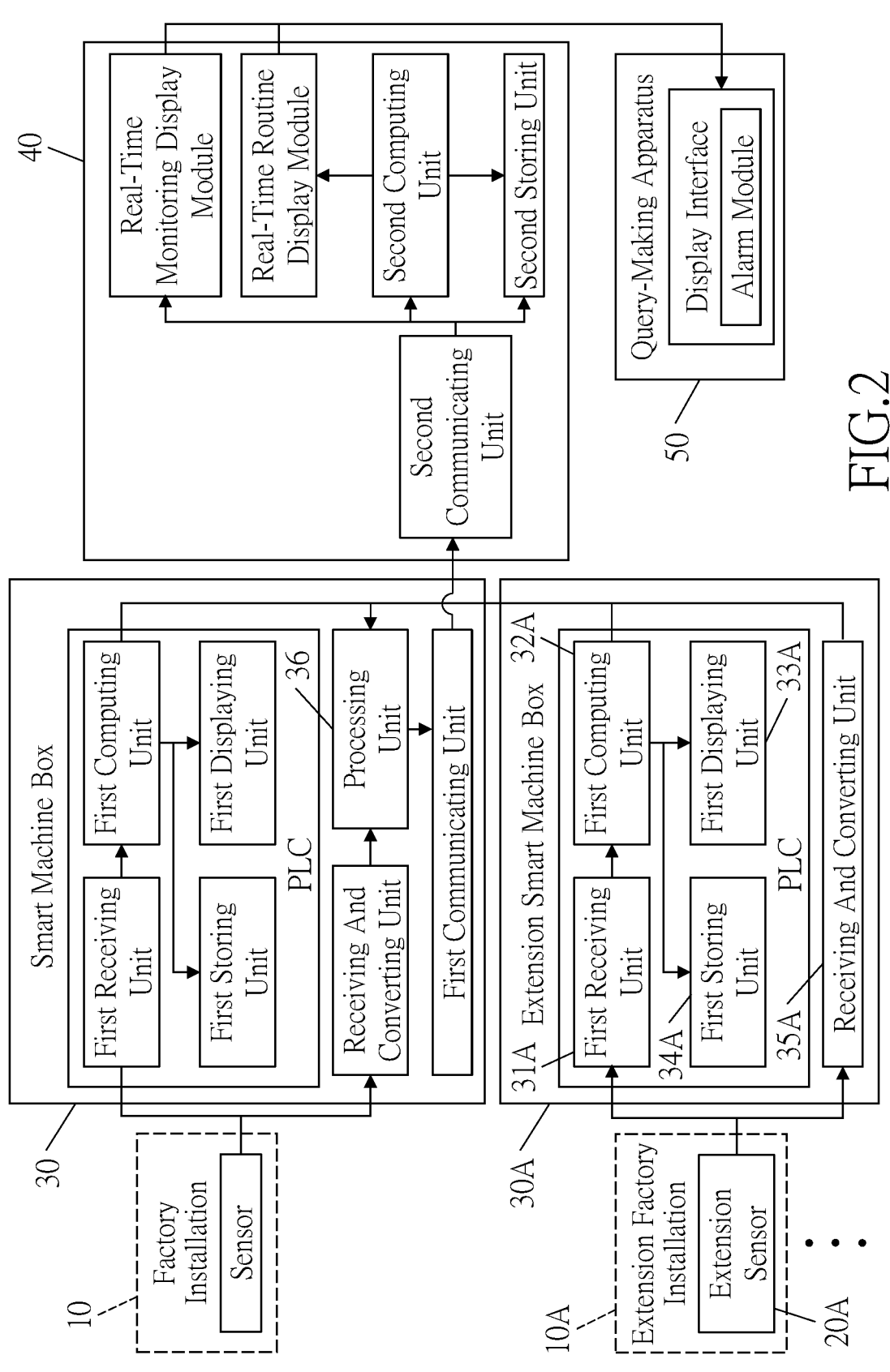
FIG. 2 is a block diagram illustrating second embodiment of the present invention.

FIG. 2 illustrates a smart factory system according to the second embodiment of the present invention that is similar to its counterpart describe the first embodiment except for the following features.

The smart factory system additionally comprises a plurality of extension factory installations 10A, a plurality of extension sensors 20A, and a plurality of extension smart machine boxes 30A. Each of the extension factory installations 10A is similar to the factory installation 10 for similarly having a monitoring feature and a routine feature. Each of the extension sensors 20A is similar to the sensors 20 for similarly being used to sense the monitoring feature and the routine feature of each of the extension factory installations 10A, so as to generate monitoring signals and routine signals, respectively. Each of the extension smart machine boxes 30A has a first receiving unit 31A, a first computing unit 32A, a first displaying unit 33A, a first storing unit 34A, and a receiving and converting unit 35A that are similar to those of the smart machine box 30. Each of the extension smart machine boxes 30A has a first computing unit 32A and receiving and converting unit 35A that are signally connected to the processing unit 36 of the smart machine box 30. In other words, the routine data set generated by the first computing unit 32A of each of the extension smart machine boxes 30A through computing are transmitted to the processing unit 36 of the smart machine box 30 and subject to subsequently processing as that described with respect to the first embodiment. The monitoring data set converted by the receiving and converting unit 35A in each of the extension smart machine boxes 30A are transmitted to the processing unit 36 of the smart machine box 30 and subject to subsequently processing as that described with respect to the first embodiment. Thereby, another implementation of the present invention is embodied.

What is claimed is:

1. A smart factory system for being set up between a smart factory and a backend-system provider, the smart factory system comprising:

a factory installation, being installed in the smart factory, and having a monitoring feature and a routine feature;

a plurality of sensors, being connected to the factory installation to sense the monitoring feature and the routine feature of the factory installation, thereby generating a monitoring signal and a routine signal, respectively;

a smart machine box, being signally connected to each of the sensors, and having a first receiving unit, a first computing unit, a first displaying unit, a first storing unit, a receiving and converting unit, a processing unit, and a first communicating unit; the first receiving unit being used to receive the routine signal and transmit the routine signal to the first computing unit; the first computing unit being used to receive the routine signal and generate a routine data set by means of computing according to the routine signal; the first displaying unit being used to display the routine data set; the first storing unit being used to store the routine data set; the receiving and converting unit being used to receive the monitoring signal and convert the monitoring signal into a monitoring data set; the processing unit, being signally connected to the first computing unit and the receiving and converting unit, and being used to reformat, classify and output the routine data set and the monitoring data set; the first communicating unit, being signally connected to the processing unit, and being used to output the reformatted and classified routine data set and monitoring data set;

a computing and storing apparatus, being set up at premises of the backend-system provider, and having a second communicating unit, a second computing unit, a second storing unit, a real-time monitoring display module, and a real-time routine display module; the second communicating unit in communicative connection with the first communicating unit, and being used to receive the routine data set and the monitoring data set output by the first communicating unit; the second computing unit signally connected to the second communicating unit, being used to receive and perform computing on the routine data set so as to generate a real-time routine data set; the second storing unit being used to store the real-time routine data set of the second computing unit; the real-time routine display module being used to display the real-time routine data set in a real-time manner; the real-time monitoring display module being used to display the monitoring data set in a real-time manner; and a query-making apparatus, being signally connected to the computing and storing apparatus, and having a display interface that is used to display the real-time monitoring data set and the routine data set in a real-time manner.

2. The smart factory system of claim 1, wherein the processing unit is a gateway.

3. The smart factory system of claim 1, wherein the display interface has an alarm module, which generates an alarm signal when being activated, in which the alarm signal is displayed at the first displaying unit of the smart machine box through the computing and storing apparatus.

4. The smart factory system of claim 3, wherein the display interface sends the alarm signal to a factory installation provider providing the factory installation.

5. The smart factory system of claim 1, wherein the real-time routine data set generated by the second computing unit through computing includes data of production capacity analysis, progress estimation, efficiency analysis, cost analysis, energy and carbon-emission analysis, or inspection overtime notifications.

6. The smart factory system of claim 1, wherein the real-time routine display module displays height difference values, consumables lifetime values, environmental safety values, energy safety values, line support notifications, line idle notifications, or qualitative abnormality notifications.

7. The smart factory system of claim 1, wherein the real-time monitoring display module displays production overview, production capacity, or factory installation status.

8. The smart factory system of claim 1, wherein the smart factory system further comprises a plurality of extension factory installations, a plurality of extension sensors, and a plurality of extension smart machine boxes, in which each of the extension factory installations is similar to the factory installation for similarly having a monitoring feature and a routine feature, and each of the extension sensors is similar to the sensors for similarly being used to sense the monitoring feature and the routine feature of each of the extension factory installations, so as to generate monitoring signals and routine signals, respectively, in which each of the extension smart machine boxes has a first receiving unit, a first computing unit, a first displaying unit, a first storing unit, and a receiving and converting unit similar to those of the smart machine box, wherein the first computing unit and the receiving and converting unit of each of the extension smart machine boxes are signally connected to the processing unit of the smart machine box.

* * * * *